Figure 2:
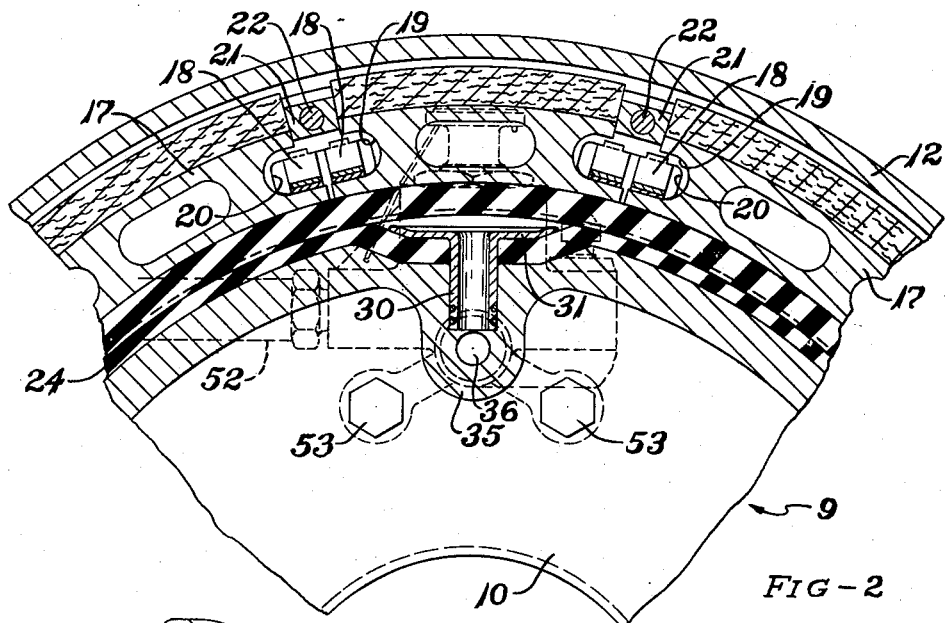

July 29, 1958 B. F. JONES ET AL 2,845,146
EXPANDER TUBE BRAKE STRUCTURE
Filed April 15, 1955

INVENTORS
BENJAMIN F. JONES
KENNETH R. DURST
BY
John D. Haney
ATTY.

United States Patent Office 2,845,146
Patented July 29, 1958

2,845,146

EXPANDER TUBE BRAKE STRUCTURE

Benjamin F. Jones and Kenneth R. Durst, Troy, Ohio, assignors to The B. F. Goodrich Company, New York, N. Y., a corporation of New York Application April 15, 1955, Serial No. 501,545

1 Claim. (Cl. 188—78)

This invention relates to brakes, and more particularly to hydraulic brakes actuated by an expansible tubular member.

The present invention provides a simple and efficient mode of connecting an expansible actuating member such as an expander tube of a hydraulic brake to a source of supply of operating fluid to distend the actuating member. Expander tube brakes have been heretofore designed so that the nipple of the expander tube through which fluid is introduced into the tube has been secured by lock nuts to the periphery of a non-rotatable torque frame of the brake and has been connected directly to a fluid-supply nozzle secured to the torque frame. An example of this construction is illustrated in U. S. Patent 2,626,020. In service this construction has been unsatisfactory because of leakage of the hydraulic fluid at the junction of the nozzle and the nipple. One of the causes of this leakage has been the difficulty of assembling these parts together in accurate alignment, but even though the seal has been initially assembled accurately, the position of the nozzle is such that bending forces exerted on the nozzle during service act directly on the nipple to cause failure of the seal at the junction of the nipple and nozzle. Another reason for the objectionable leakage has been that the lock nuts which secure the nipple to the torque frame have frequently loosened in service and allowed the nipple to wobble within the nozzle and to work loose from the resilient body of the expander tube. Further, the radial load-sustaining portions of the torque frame have usually been provided with ports through which the nozzle extended and such ports appreciably weakened the torque frame.

In accordance with the present invention the foregoing objectionable conditions are avoided. Briefly stated, this result is accomplished by eliminating the nipple locking nut and engaging the nipple and the nozzle at opposite ends of a fluid-conducting passage formed through the torque frame. Means are provided for maintaining the nipple and nozzle in fluid-sealing engagement with their respective ends of the fluid passage in the torque frame. Further explanation of the invention will be made in connection with the accompanying drawings which illustrate portions of an expander tube brake made in accordance with and embodying this invention.

Figure 1:
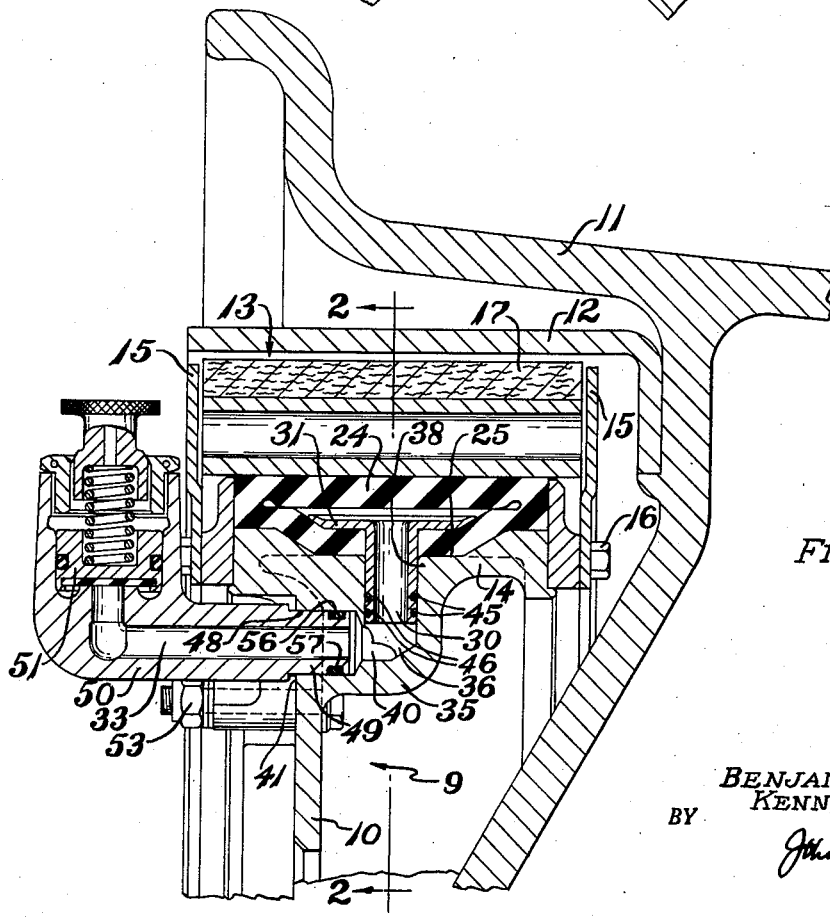

In the drawings:

Fig. 1 is a fragmentary radial cross-sectional view of an expander tube brake showing the improved mode of interconnecting the expander tube nipple and nozzle with the torque frame of the brake; and Fig. 2 is a side elevational view partly in section showing the appearance of the brake along a plane indicated by the line 2—2 of Fig. 1.

Referring to the drawings, the illustrated brake structure includes a torque frame 9 having a radial flange portion 10 which may be secured in any desired manner to an axle (not shown) about which the wheel 11 rotates. A brake drum 12 is fixed to the wheel structure for rotation relative to the torque frame 9 and the brake drum 12 surrounds a channel 13 defined by the peripheral surface of a peripheral flange portion 14 of the torque frame and a pair of radial side flanges 15 secured to the periphery of the torque frame by bolts 16. Positioned in the channel 13 is a series of arcuate brake blocks 17 which are normally maintained in a retracted position within the channel in radially-spaced relation to the brake drum 12 by flat retractor springs 18 which extend transversely across the channel through grooves 19 in the end faces of the brake blocks. The ends of the springs 18 project through and interlock with slots 20 in the side flanges to engage the side flanges. The several brake blocks 17 are spaced one from another by transverse torque bars 21 secured transversely between the radial side flanges 15 by bolts 22.

The brake blocks 17 are movable radially outwardly from the channel 13 and radially against the brake drum 12 by an expander tube 24, which extends circumferentially around the external peripheral surface of the peripheral flange 14 of the torque frame, and which is seated in a groove 25 in the periphery of the flange 14. The expander tube is an endless tubular member preferably made of resilient rubber material or the like, and which may be reinforced with various plies of fabric, if desired. In the inactive or deenergized condition of the brake the walls of the expander tube are normally flattened against each other, and the brake blocks 17 are seated within channel 13 against the expander tube. The expander tube is formed with a single nipple 30 projecting radially inward from the tube and molded integrally with the body of the expander tube. The nipple 30 is a metal hollow tubular member having a circular head 31 on the interior of the tube. Fluid for operating the brake is delivered by a nozzle 33 to the nipple 30 through which the fluid is introduced into the interior of the expander tube to fill the interior cavity and thereby distend the upper wall of the expander tube and force the brake blocks radially outward against the resistance of the retractor springs into engagement with the brake drum.

In accordance with this invention, the torque frame 9 in the region adjacent the nipple 30 of the expander tube is provided with a boss 35 located between the peripheral flange portion 14 and the radial flange portion 10 of the torque frame. A fluid-conducting passage 36 is formed through boss 35, the passage having an end 38 communicating with the peripheral surface of the peripheral flange 14 against which the expander tube is seated and having an opposite end 40 which communicates with a face 41 of the radial flange 10 of the torque frame.

The nipple 30 of the expander tube has an exterior surface which is preferably smooth and cylindrical and sized so that it fits snugly into the end 38 of the fluid-conducting passage 36. The nipple is provided near its outer extremity with a pair of annular grooves 45 each containing an annular resilient rubber sealing ring 46 which when the nipple is inserted into the passage bears against the walls of the passage to form a fluid-tight seal between the exterior surface of the nipple and the passage. The nipple is urged into the mouth of the opening against the resistance of these rubber sealing rings and these rings together with the snug fit of the nipple with the passage maintain the nipple firmly seated in the end mouth 38 of the passage 36 in the torque frame.

The opposite end 40 of the passage 36 is counterbored to provide a mouth 48 of greater diameter than the remaining portions of the passage to receive a cylindrical projecting end 49 of the nozzle 33. The nozzle includes a main body portion 50 which may have a pressure-regulating valve 51 or other suitable equipment such as a valve for adjusting the clearance between the brake blocks and the drum, and a suitable connection 52 to the fluid pressure system of the vehicle. The main body 50 of the nozzle is secured rigidly to the radial flange 10 of the torque frame by bolts 53 with its end 49 of the nozzle projecting into the mouth 48 of the passage 36. The end 49 fits snugly within the mouth 48 and is provided with an annular groove 56 containing a resilient rubber sealing ring 57 to provide a liquid tight seal against the wall of mouth 48. In installing the nozzle, the end 49 is urged into the mouth of the passage against the resistance of the sealing ring and then the main body of the nozzle is secured rigidly to the radial flange by the bolts 53.

It may be noted that in this construction, bending forces applied to the nozzle itself are transmitted to the rigid torque frame 9 and cannot affect the seal between the nipple and the torque frame. Since the end 49 of the nozzle is comparatively short, bending of the nozzle relative to the torque frame has no appreciable effect on the seal provided by the rubber ring 57. Similarly, loads imposed on the expander tube by the brake blocks do not affect the integrity of the seal provided by the rings 46 between the nipple 30 and the torque frame. Also, the alignment of the nozzle and of the nipple with their respective ends of passage 36 need not be as critical as with the former construction, since their respective seals will be effective even though there is some slight misalignment. There is no tendency for the nipple to become dislodged, since each time the expander tube is inflated the pressure of the fluid in the expander tube urges the nipple firmly into the passage. The expense of providing threads and the like about the exterior of the nozzle is eliminated as well as the locking nuts which were formerly used to secure the nipple to the torque frame. This construction also makes it more convenient to remove the expander tube from the brake for routine maintenance and repairs. Further, the torque frame is strengthened by the presence of the boss 35 rather than being weakened as was the case with the use of ports through the torque frame in the previous constructions.

Variations in the structure may be made within the scope of the appended claim.

We claim:

A brake structure comprising a torque frame having an annular peripheral flange and an inwardly extending radial flange, an expansible member seated on and extending circumferentially around said peripheral flange, a rotatable drum concentrically surrounding said expansible member in radially spaced relation, a non-rotatable braking member engaged with said torque frame and disposed between said drum and said expansible member and being movable into braking engagement with the drum by distension of said expansible member under fluid pressure, a boss disposed between said peripheral flange and said radial flange, a fluid-conducting passage through said boss opening at one end into said peripheral flange and opening at its opposite end into said radial flange, a nipple integral with said expansible member through which fluid is admitted into said member, the nipple having a smooth external surface seated snugly in the passage at said peripheral flange and an annular resilient sealing member surrounding a portion of the nipple within the passage to provide fluid-tight frictional engagement between the nipple and said passage whereby the nipple is adapted for axial slidable movement for insertion and removal, and a fluid-supply nozzle through which fluid is supplied to said passage, said nozzle having an end portion having a smooth external surface seated snugly in the passage at said radial flange and an annular resilient sealing member surrounding the end portion of the nozzle within the passage to provide fluid-tight frictional engagement between the end portion and said passage whereby the end portion of the nozzle is adapted for axial slidable movement for insertion and removal, and said nozzle having a body portion abutting said radial flange in the region thereof surrounding the passage, and means for fastening said body portion of the nozzle against said region of the radial flange.

References Cited in the file of this patent

UNITED STATES PATENTS

| | | |
|---|---|---|
| 1,782,566 | Down | Nov. 25, 1930 |
| 2,162,757 | Shaw | June 20, 1939 |
| 2,203,862 | Eason | June 11, 1940 |
| 2,388,151 | Hunter | Oct. 30, 1945 |
| 2,473,646 | Hollerith | June 21, 1949 |
| 2,499,585 | Hollerith | Mar. 7, 1950 |

FOREIGN PATENTS

| | | |
|---|---|---|
| 716,139 | Great Britain | Sept. 29, 1954 |